UNITED STATES PATENT OFFICE.

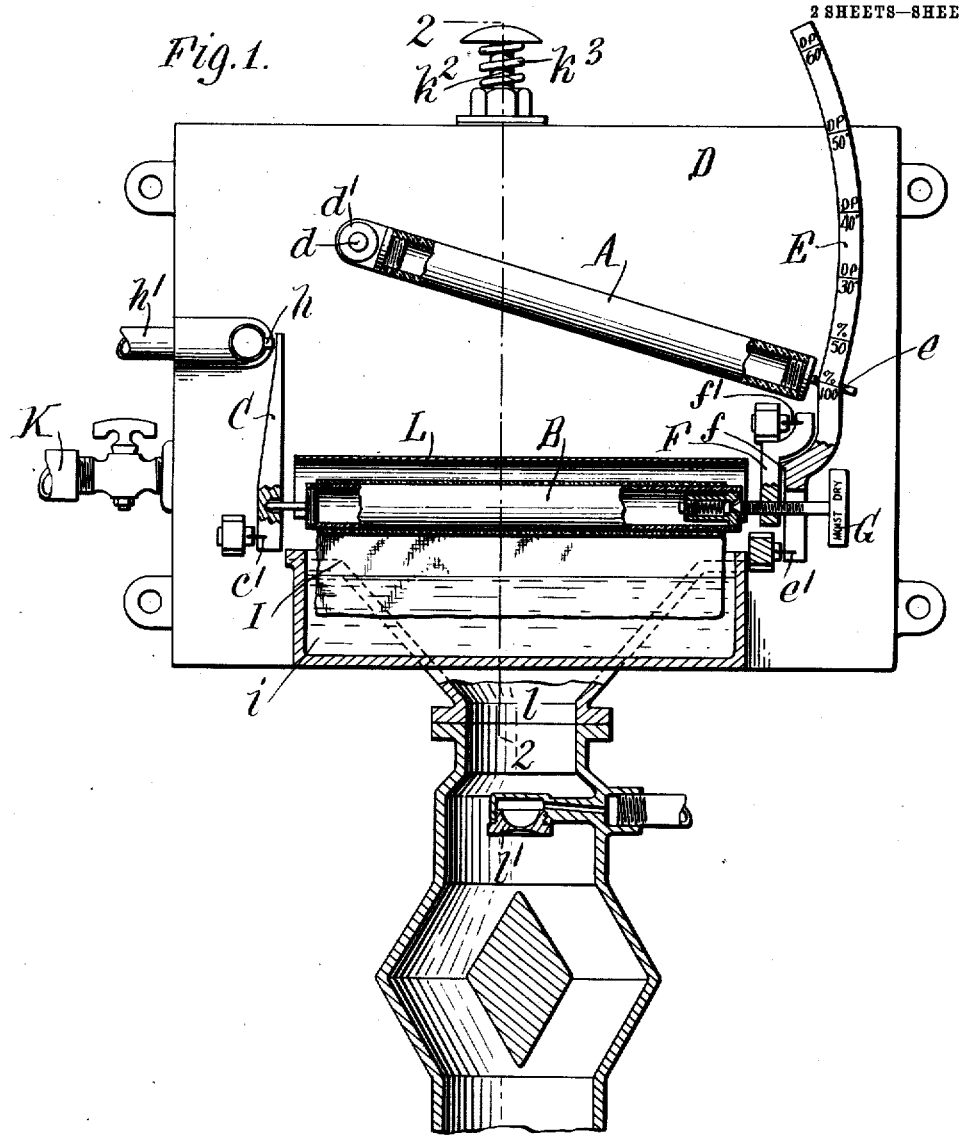

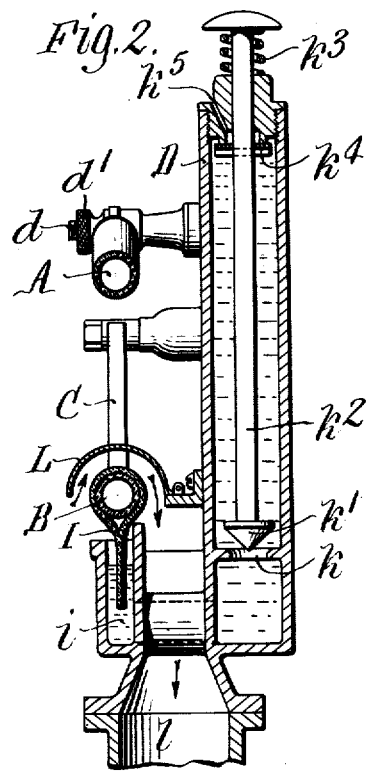
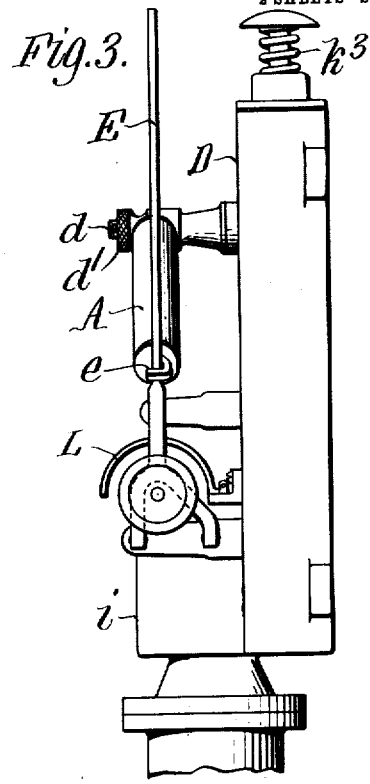
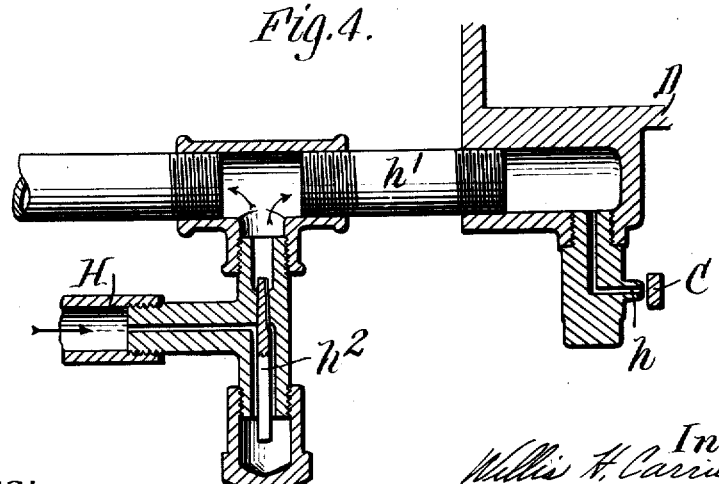

WILLIS H. CARRIER AND EDWARD W. COMFORT, OF BUFFALO, NEW YORK, ASSIGNORS TO BUFFALO FORGE COMPANY, OF BUFFALO, NEW YORK.

THERMOSTATIC REGULATING DEVICE.

No. 929,655.  Specification of Letters Patent.  Patented Aug. 3, 1909.

Application filed September 28, 1908. Serial No. 455,208.

*To all whom it may concern:*

Be it known that we, WILLIS H. CARRIER and EDWARD W. COMFORT, citizens of the United States, residing at Buffalo, in the county of Erie and State of New York, have invented a new and useful Improvement in Thermostatic Regulating Devices, of which the following is a specification.

This invention relates to thermostatic instruments which are influenced by the temperature and hygrometric conditions of the surrounding atmosphere and are primarily utilized for regulating the humidity of the air. An instrument of this sort is disclosed in Patent No. 896,690, granted Aug. 18, 1908, to W. H. Carrier, assignor to Buffalo Forge Company, which comprises two expansible elements, one affected by the actual or "dry bulb" temperature of the surrounding air, and the other affected by the lower "wet bulb" temperature of the air produced by evaporating moisture around this element. As the evaporation of the moisture is more or less rapid, depending upon the hygrometric condition of the air, it follows that the "wet bulb" temperature of the air rises or falls relative to the "dry bulb" temperature in proportion as the air is more or less humid. Consequently the relative expansion or contraction of the two elements is dependent upon the relation existing between the temperature and the humidity of the air affecting them, and the position of a device operated by the conjoint differential action of these elements can accordingly be used, through suitable instrumentalities, for regulating the humidity of the air. The changes in the dry and wet bulb temperatures of the air which take place while the percentage of humidity remains constant, bear a practically fixed relation or ratio to each other within ordinary ranges of temperature, but the ratios differ for different percentages of humidity. Likewise the ratio of changes in the dry and wet bulb temperatures of the air remains practically constant for the same absolute humidity, but differs for different absolute humidities. In said patented device, expansible elements having different coefficients of expansion are used and means are provided for changing the ratio of expansion or contraction of the two elements to correspond to different ratios existing between the changes in the wet and dry bulb temperatures of the air under different conditions of humidity, so that by different adjustments of the device it will maintain different desired hygrometric conditions notwithstanding wide fluctuations in the temperature of the air.

The object of the present invention is to produce a reliable and accurate instrument of this character which is of simple and practical construction and can be readily adjusted to secure different desired hygrometric conditions, but in which expansible elements can be employed having the same or unchangeable coefficients of expansion. This is accomplished by providing two expansible elements, preferably alike, termed, for convenience, the "dry" and the "wet" elements, which are affected respectively by the dry and wet bulb temperatures of the air and operate in opposition on the regulating device or valve through a lever mechanism which can be adjusted to give different ratios of leverage between said elements, depending upon the desired result to be obtained.

The changes in dimensions of the thermostat elements produced by ordinary temperature fluctuations are, in practice, very small, and ordinarily complicated mechanism operated by the expansible elements is required for effecting the humidity regulation.

Another object of this invention is to produce an instrument of small size, and compact and durable construction, which will operate in response to these small changes in the expansible elements and will be efficient and reliable for humidity regulation.

In the accompanying drawings, consisting of two sheets: Figure 1 is a front elevation, partly in section, of a regulating instrument embodying the invention. Fig. 2 is a sectional elevation thereof in line 2—2, Fig. 1. Fig. 3 is an end elevation thereof. Fig. 4 is a sectional plan, on an enlarged scale, of the regulating valve.

Like letters of reference refer to like parts in the several figures.

A and B represent respectively the so-called "dry" and "wet" expansible elements, which preferably consist of similar tubes of ebonite, or pieces of other suitable material having a high coefficient of expansion, and C represents a regulating device or lever. The dry and wet bulb elements A and B, as stated, are affected respectively by the actual, or dry bulb, and wet bulb temperatures of the air, provision being made for evaporating moisture around the wet element, and the two elements operate in opposition to each other on the regulating device through an adjustable lever mechanism.

The expansible elements can be arranged and connected in different ways so that one will be thus affected by the wet bulb temperature of the air, and to allow for changing the ratio of leverages on the regulating device. In the construction shown in the drawings, the dry element A is pivoted at one end to a post $d$ projecting from a base or support D and is provided at its free end with a knife edge $e$ which bears on a lever E. The element A can be swung on its pivot post $d$ to cause its knife edge to bear on the lever at different distances from the lever fulcrum, and it is held, when adjusted, by a binding nut $d'$ screwed on the pivot post $d$. The lever E has a knife edge engagement $f$ with a second lever F which carries an adjusting screw G having a pointed end bearing against one end of the wet element B. The wet element B is provided at its other end with a reduced or pointed part bearing against the regulating device or lever C. The levers C, E and F are fulcrumed to posts projecting from the base, preferably by thin flat springs $c'$, $e'$, and $f'$, respectively, which are fixed to the levers and posts. These fulcrum springs hold the levers in place and prevent looseness in the joints and lost motion between the parts, and the spring $c'$ for the regulating lever C tends to move said lever toward and hold it against the end of the wet element B. The regulating device or lever will remain stationary or be moved in one or the other direction, depending upon the relative changes in length of the two expansible elements caused by changes in the temperatures affecting them, and the relative leverages which they exert on the regulating device.

The free end of the regulating lever C acts as a valve to control a bleeder or escape orifice $h$, Fig. 4, in a branch $h'$ of a pipe H which supplies compressed air to the actuating diaphragm or motor of the apparatus (not shown) which regulates the humidity of the air. A restricting valve $h^2$ is provided in the air pipe H which permits only a very small quantity of air to pass to the regulating motor. If the bleeder orifice is closed by the regulating device C the air passing the restricting valve to the motor will operate the motor to move the part actuated thereby in one direction, whereas if the regulating device C is moved to open the bleeder orifice the air will escape from the diaphragm through the orifice faster than it can pass the restricting valve to the motor, thus permitting the motor to effect an opposite movement of the part actuated thereby. Thus the regulating device C by opening and closing the bleeder orifice $h$ acts, through the humidity regulating apparatus, to effect a change in the humidity of the air. Very little force is required to operate the regulating device C and the movement thereof necessary for effecting the regulation is so small that the instrument regulates accurately and responsively to slight fluctuations in temperature and humidity. The described means whereby the movement of the regulating lever C effects the regulation are therefore desirable, but the invention is not restricted to these means and other instrumentalities governed by the movement of the lever C, or other part similarly actuated, can be employed for effecting the regulation.

The means shown for subjecting the wet element B to the wet-bulb temperature of the air consist of a wick I of absorbent material which surrounds the wet element and is kept wet by dipping into a water receptacle $i$ to which water is fed from the base D, which is hollow and forms a large water reservoir. A water supply pipe K connects with the reservoir above a partition which divides the reservoir into two chambers connecting through a hole $k$ in the partition. A valve $k'$ on a push rod $k^2$ extending through the top of the base controls the hole $k$. A spring $k^3$ normally holds the valve $k'$ off of its seat and holds a second valve $k^4$ on the push rod against the inner end of an air vent passage $k^5$ in the top of the reservoir. To fill the reservoir the rod $k^2$ is pushed downwardly to seat the valve $k'$ and open the air vent $k^5$, and the cock of the supply pipe K is then turned to admit water to the reservoir. When the reservoir is filled the push rod is released, when the reservoir will automatically replenish the water taken from the well by the wick I. Air is caused to circulate past the wet element B under a shield L partially inclosing the element and through a passage $l$ in the base D to evaporate the moisture from the wick, by an aspirator $l'$ which is located in said passage $l$. The shield L is preferably hinged to the base so that it can be turned back out of the way to permit the wick to be put in place. Any other suitable means can be employed for causing the temperature of the wet element to correspond to the wet-bulb temperature of the air.

The operation of the instrument is as follows: Under conditions of saturation the dry and wet bulb temperatures of the air are the same and any change in the actual temperature is followed by a like change in the wet bulb temperature, which results in the same change in the length of both of the expansible elements A and B. To maintain a saturated condition therefore it is necessary for the two elements to have an equal but opposite effect on the regulating device C, and the dry element A must be adjusted to bear on the lever E at the point marked 100 per cent., when the ratio of the leverages of the two elements will be equal. Changes in the dry bulb temperature, when the humidity is less than 100 per cent., are accompanied by changes of different degree in the wet bulb temperature, but, as before stated, the changes in the dry and wet bulb temperatures bear a definite, practically constant ratio to each other for any given percentage of humidity. For example, with a humidity of 50 per cent. a change of 10° in the dry bulb temperature will be accompanied by a change of 8½° in the wet bulb temperature. To maintain this humidity, therefore, the dry element is set to bear on the lever E at the point marked 50 per cent., when the ratio of the leverages of the dry and wet elements will be as 10 to 8½, with the result that a 10 per cent. change in the length of the dry element will have an effect on the regulating device C equal but opposite to an 8½ per cent. change in the wet element. In like manner, the proper ratios of leverages for other desired percentages of humidity are secured by adjusting the dry element to the points on the lever E indicating such humidities. The instrument can also be adjusted to maintain a desired absolute humidity by setting the dry element so that the ratio of the leverages of the two elements corresponds to the ratio of changes in the dry and wet bulb temperatures which exists with such absolute humidity. The lever F is marked 30° D. P., 40° D. P., &c., to indicate the points at which the dry element should be set to maintain these respective absolute humidities. Likewise, other desired conditions of humidity could be secured by adjustments which would give the required lever ratios between the two expansible elements.

The described adjustment of the dry element on the lever E merely gives the required ratio of leverages to compensate for the temperature fluctuations. Besides this adjustment, the screw G is adjusted, as indicated by graduations on its enlarged head, to properly set the regulating lever C to secure the necessary difference between the wet and dry bulb temperatures for a desired humidity condition.

We claim as our invention:

1. The combination of two expansible elements which are separately influenced by the dry and wet bulb temperatures of the air, a device which is operated by the conjoint action of said expansible elements, and means which are adjustable to give different ratios of leverage between said expansible elements and said device, substantially as set forth.

2. The combination of two expansible elements which are separately influenced by the dry and wet bulb temperatures of the air, a device which is operated by the conjoint action of said expansible elements, and an adjustable lever mechanism for transmitting motion from said expansible elements to said device, substantially as set forth.

3. The combination of two expansible elements which are separately influenced by the dry and wet bulb temperatures of the air, a device which is operated by the conjoint action of said expansible elements, and lever mechanism between said expansible elements, which mechanism is adjustable whereby said elements have an equal but opposite effect on said device under different atmospheric conditions, substantially as set forth.

4. The combination of two expansible elements, one of which is affected by the temperature of the air, means for evaporating moisture in the vicinity of the other element, a device which is operated by the conjoint action of said expansible elements, and means which are adjustable to give different ratios of leverage between said expansible elements and said device, substantially as set forth.

5. The combination of two expansible elements which have the same coefficient of expansion and are separately influenced by the dry and wet bulb temperatures of the air, a device which is operated by the conjoint action of said expansible elements, and means which are adjustable to give different ratios of leverage between said expansible elements and said device, substantially as set forth.

6. The combination of two expansible elements which have the same coefficient of expansion and are separately influenced by the dry and wet bulb temperatures of the air, a device which is operated by the conjoint action of said expansible elements, and an adjustable lever mechanism for transmitting motion from said expansible elements to said device, substantially as set forth.

7. The combination of expansible elements which are separately influenced by different temperatures, a regulating device which is operated by the conjoint action of said expansible elements, and lever mechanism between said expansible elements, which mechanism is adjustable whereby said elements have an equal but opposite effect on said regulating device under relatively different temperature conditions, substantially as set forth.

8. The combination of two expansible elements which are separately influenced by the dry and wet bulb temperatures of the air, a device which is operated by the conjoint action of said expansible elements, and lever mechanism between said expansible elements, one of said elements having an adjustable connection with said lever mechanism, substantially as set forth.

9. The combination of two expansible elements which are separately influenced by the dry and wet bulb temperatures of the air, a device which is operated by the conjoint action of said expansible elements, lever mechanism between said expansible elements, which mechanism is adjustable, and means for adjusting the position of said regulating device, substantially as set forth.

10. The combination of two expansible elements which are separately influenced by the dry and wet bulb temperatures of the air, a device which is operated by the conjoint action of said expansible elements, levers having an operative connection with each other, an adjustable connection between one of said expansible elements, and one lever and an adjustable connection between the other expansible element and another lever, substantially as set forth.

11. The combination of two expansible elements which are separately influenced by the dry and wet bulb temperatures of the air, a regulating device in connection with one of said expansible elements, and lever mechanism between said elements having an adjustable connection with said other expansible element, substantially as set forth.

Witness our hands, this 23rd day of September, 1908.

WILLIS H. CARRIER.
EDWARD W. COMFORT.

Witnesses:
WM. L. Fox,
E. A. Voss.